(12) United States Patent
Cardin

(10) Patent No.: US 6,494,680 B2
(45) Date of Patent: Dec. 17, 2002

(54) ROTOR WITH ROTOR HEAD VIBRATION SUPPRESSOR COMPRISING VERTICAL PENDULUMS

(75) Inventor: Véronique Cardin, Vitrolles (FR)

(73) Assignee: Eurocopter (FR)

( * ) Notice: Subject to any disclaimer, the term of this patent is extended or adjusted under 35 U.S.C. 154(b) by 0 days.

(21) Appl. No.: 09/840,383

(22) Filed: Apr. 23, 2001

(65) Prior Publication Data
US 2001/0048875 A1 Dec. 6, 2001

(30) Foreign Application Priority Data
Apr. 27, 2000 (FR) .............................. 00 05374

(51) Int. Cl.[7] .......................... B64C 27/32; B64C 27/51
(52) U.S. Cl. ....................................... 416/145; 416/500
(58) Field of Search ............................ 416/80, 81, 82, 416/83, 145, 500

(56) References Cited

U.S. PATENT DOCUMENTS

| 2,225,929 A | 12/1940 | Sarazin | 416/18 |
|---|---|---|---|
| 2,489,343 A | 11/1949 | Wasserman et al. | 416/102 |
| 3,372,758 A | 3/1968 | Jenney | 416/103 |
| 4,218,187 A | 8/1980 | Madden | 416/145 |
| 4,239,456 A | 12/1980 | Joglekar et al. | 416/145 |
| 4,431,148 A * | 2/1984 | Mouille | 244/17.25 |
| 5,639,214 A | 6/1997 | Guimbal | 416/145 |
| 6,062,818 A | 5/2000 | Manfredotti et al. | 416/145 |

FOREIGN PATENT DOCUMENTS

GB  2 123 371  7/1982

* cited by examiner

Primary Examiner—Edward K. Look
Assistant Examiner—Richard A. Edgar
(74) Attorney, Agent, or Firm—Piper Rudnick (57) ABSTRACT

The rotor comprises a pendular vibration suppressor with at least two pendulums each having at least one pendular body connected by at least one rigid arm to a support that rotates as one with the rotor hub, and on which the pendulum oscillates via a pivoting connection about an axis of pendular movement spaced away from the center of inertia of the pendulum and from the axis of the rotor, and substantially perpendicular to a radial plane passing through the axis of the rotor and through the center of inertia of the pendulum, which preferably oscillates between two adjacent rotor blades. At least some of the pendulums are tuned to $(nb-1)\Omega$ or $(nb+1)\Omega$, so as to attenuate coplanar moments, and other pendulums may be tuned to $nb\Omega$, to filter out forces along the axis of the rotor.

13 Claims, 4 Drawing Sheets

ROTOR WITH ROTOR HEAD VIBRATION SUPPRESSOR COMPRISING VERTICAL PENDULUMS

BACKGROUND OF THE INVENTION

The invention relates to a rotorcraft rotor, particularly a helicopter main rotor, comprising a rotor head at which a hub intended to be driven in rotation about an axis of the rotor is connected to at least two rotor blades, the rotor also comprising a rotor head vibration suppressor also known as a rotor head resonator, that is to say a device for attenuating the vibrations generated by the movement of the rotationally driven rotor, the vibration suppressor being used at the rotor head to effectively counter the vibrations directly at the source where they are produced.

The desired effect is to improve the vibration comfort in the cabin of a helicopter by reducing the level of vibration in the cabin as far as possible using a rotor head vibration suppressor the weight and cost of which are as low as possible, the structure of which is as simple as possible, and which is economical to maintain, while at the same time being highly effective.

The level of vibration in the cabin of a helicopter depends chiefly on the dynamic excitation of the main rotor and on the dynamic response of the helicopter structure. The dynamic excitation of the rotor results from the aerodynamic loadings on the rotor blades and can be broken down into, on the one hand, a force in the plane of the rotor, or coplanar force, exerted in a plane perpendicular to the axis of rotation of the rotor, and, on the other hand, into a force said to be "vertical" because it is exerted along the axis of the rotor, and into a moment said to be "coplanar", in a plane perpendicular to the axis of the rotor.

It is known that the frequencies of the "vertical" forces along the axis of the rotor in a rotating frame of reference are multiples of $b\Omega$ where b is the number of rotor blades and $\Omega$ is the angular speed of rotation of the rotor and that the frequencies of the coplanar moments applied to the rotor are $(nb-1)\Omega$ or $(nb+1)\Omega$, where n is an integer at least equal to 1.

For these reasons, known rotor head vibration suppressors, designed to reduce the dynamic excitation of the rotor, are essentially of two types, the first type relating to coplanar vibration suppressors for countering the forces in a plane perpendicular to the axis of the rotor, and the second type relating to "vertical" or "flap" vibration suppressors for attenuating forces and vibrations parallel to the axis of the rotor and generated by the flapping of the blades, and to counter the coplanar moments.

FR-A-2 733 483 and U.S. Pat. No. 5 639 214 have recently proposed that the well known coplanar vibration suppressors with at least one mass urged by at least one spring, or of the type known as "bifilar", be replaced by pendular coplanar vibration suppressors comprising at least one pendular body mounted to oscillate on a support coaxial with the rotor mast and driven in rotation about the axis of the rotor, directly by the rotor head, and so that the pendular body can oscillate about an axis of pendular movement which is spaced away both from the center of inertia of the pendular body and from the axis of the rotor to which the axis of pendular movement is substantially parallel.

The pendular bodies of such pendular coplanar vibration suppressors therefore move in a plane parallel to the plane of the rotor, or even coincident with it, and their movements generate coplanar inertial forces which oppose the forces exerted in the plane of the rotor.

The "vertical" or "flap" vibration suppressors most commonly used are also pendular vibration suppressors comprising at least one pendulum for each rotor blade, that is to say at least two pendulums per rotor and each pendulum comprises at least one pendular body connected by at least one rigid arm to a support driven in rotation about the axis of the rotor and on which the pendulum is mounted to oscillate via a pivoting connection about an axis of pendular movement spaced away from the center of inertia of the pendulum and from the axis of the rotor. However, in these known "vertical" pendular vibration suppressors, the support is mounted transversely on or in the root of the corresponding blade or the connecting member, generally known as the cuff, connecting this blade to the hub, the axis of pendular movement then being substantially perpendicular to the longitudinal axis or pitch-change axis of the corresponding blade, which is an axis that is substantially radial with respect to the axis of the rotor, to which the axis of pendular movement may also be substantially perpendicular when the pitch of the corresponding blade is neutral.

Pendular vibration suppressors of the coplanar or vertical type have the advantage of being more lightweight than vibration suppressors of the other known types, because pendular vibration suppressors use centrifugal force as the force that returns the pendular bodies, which allows them to adapt to suit the variations in rotor rotational speed, and therefore makes them self-adapting or self-adjusting, if the influence of the speed of travel of the helicopter is neglected.

Furthermore, pendular "vertical" vibration suppressors, which oppose the vertical forces of the rotor and the coplanar moments, have the advantage that the pendulums mounted on the blades or on the flapping masses consisting of the blades with their cuffs that connect them to the hub, pivot about axes of pendular movement which are relatively distant from the center of the hub, which makes it possible to increase the maximum tuning frequency and the effectiveness of the pendulums.

These embodiments, known in particular from U.S. Pat. No. 4,239,456 and GB-2 123 371, do, however, have two major drawbacks. First of all, the blade pendulums are difficult to adjust because they are subjected to the changing pitch of the blades. Secondly, the presence of the pendulums on the blades increases the stresses along the blades, both in terms of drag and in terms of flapping, and for various rotor harmonics.

Hence, the blade pendulums affect the dynamic response of the blades and, more specifically, the stresses in the blades increase at the frequency to which the vibration suppressor is tuned, in particular, and at the harmonics of the rotor speed, in general.

BRIEF SUMMARY OF THE INVENTION

The object of the invention is to overcome these drawbacks of the known blade, or more generally, flapping mass, pendular vibration suppressors and to propose a "vertical" and pendular rotor head vibration suppressor, the operation and adjustment of which are not hampered by the pitch of the blades, which does not affect the dynamic response of the blades, does not introduce additional stress along the blades, and remains of a simple and economical structure, easy to maintain and of a limited mass while at the same time being highly effective, and which can be incorporated compactly into the rotor head.

To this end, the pendular "vertical" vibration suppressor equipping the rotorcraft rotor of the type described hereinabove is a vibration suppressor which comprises at least two pendulums, each of which comprises at least one pendular body connected by at least one rigid arm to said hub so that each pendulum rotates as one with said hub about the axis of the rotor, and mounted so as to oscillate with respect to said hub via a pivoting connection about an axis of pendular movement which is spaced from the center of inertia of the pendulum and from the axis of the rotor and is substantially perpendicular to a radial plane passing through the axis of the rotor and through the center of inertia of the corresponding pendulum without the possibility of the pendulum oscillating about an axis parallel to the axis of the rotor and concurrent with the axis of pendular movement so as to attenuate vibrations generated by the movement of the rotor, and is one wherein the mass and the inertia of each pendulum of a first group of at least two pendulums, and its lever arm between its center of inertia and the axis of pendular movement, and the radius of attachment between the axis of the pendular movement and the axis of the rotor, are chosen so that the natural frequency of the pendulum is tuned to attenuate coplanar moments, to $(nb+1)\Omega$ or $(nb-1)\Omega$ where n is an integer at least equal to 1, b is the number of rotor blades and $\Omega$ is the rotational speed of the rotor.

By using simple "vertical" pendulums, oscillating in radial planes (passing through the axis of the rotor) and fixed to the rotor hub either directly or via at least one corresponding support that rotates as one with the hub, the rotor blades are not loaded by these pendulums, which are not subjected to the variations in blade pitch, and of which the pendular movements, preferably in the gaps between the adjacent blades, without interfering with the blades, their members for connection to the hub, the means for retaining and articulating these connecting members to the hub, nor with the pitch levers or drag dampers generally located laterally on each side of the connecting members, generate "vertical" inertial forces in the radial planes of travel of the pendulums, which counter the coplanar moments depending on the frequency tuning applied.

Advantageously, the rotor head vibration suppressor according to the invention comprises hub "vertical" pendulums from the first group of pendulums, the natural frequency of which is adjusted to $(b-1)\Omega$, which corresponds to the greatest excitation affecting coplanar moments. This characteristic makes it possible to reduce the angular acceleration of the rotor head in $(b-1)\Omega$.

If the harmonic $(b+1)\Omega$ of the coplanar moments has also to be reduced, other "vertical" pendulums from the first group of pendulums of the vibration suppressor have their natural frequency adjusted to this harmonic.

Advantageously, the rotor head vibration suppressor with "vertical" pendulums oscillating on the hub and rotating with it additionally comprises pendulums from a second group of at least two pendulums, the natural frequency of which is tuned, to filter out "vertical" forces along the axis of the rotor, to $nb\Omega$, particularly to the harmonic $b\Omega$ of the vibrational speed of the rotor, because this harmonic corresponds to the greatest excitation. This natural frequency of the pendulums of the second group is also obtained by choosing the mass and the inertia of each pendulum, its lever arm between its center of inertia and the axis of pendular movement, and its radius of attachment between the axis of pendular movement and the axis of the rotor. This characteristic makes it possible to reduce the "vertical" (along the axis of the rotor) acceleration on the rotor head in $b\Omega$.

To this end, it may be advantageous for the pendular vibration suppressor to comprise at least one double pendulum comprising two pendular bodies oscillating about one and the same axis of pendular movement and each connected to the hub or to the corresponding support by at least one respective arm, the two pendular bodies and their respective arms having two different natural frequencies.

These two different natural frequencies may be different enough to allow distinct harmonics of the vibrational state of the rotor to be countered, in which case these two frequencies are chosen from the frequencies $(nb-1)\Omega$, $(nb+1)\Omega$ and $nb\Omega$, but may also differ from one another only slightly so as to allow just one harmonic such as $(nb-1)\Omega$ or $(nb+1)\Omega$ or $nb\Omega$ to be attenuated, but at different speeds of travel of the helicopter.

In order to ensure that such a double pendulum is appropriately compact and can be integrated suitably into the rotor head, a first pendular body of the double pendulum may be connected to the hub or to the corresponding support by a first arm mounted to oscillate between two second arms which may, similarly, connect a second pendular body of the double pendulum to the hub or to the support so that the first pendular body and the first arm are imbricated between the two second arms and the second pendular body, and possibly the support.

In practical terms, the pendular vibration suppressor may comprise at least one support which rotates as one with said hub about the axis of the rotor and on which pendulums are mounted to oscillate by corresponding pivoting connections, said support being substantially star-shaped, having branches supporting pendulums and being fixed coaxially to the hub so that each branch of the star-shaped support extends substantially radially outward with respect to the axis of the rotor and supports an oscillating pendulum at its outer radial end.

However, it is also possible for the pendular vibration suppressor to comprise supports which rotate as one with the hub about the axis of the rotor, each support being substantially elongate and oriented substantially radially with respect to the axis of the rotor, each support supporting at least one oscillating pendulum at its outer radial end and being fixed by its inner radial end directly to the hub, preferably between two adjacent blades and respective members for connecting said blades to the hub.

Advantageously, for appropriate integration into the rotor head, each pendulum is mounted to oscillate substantially between two adjacent blades of the rotor and possibly respective members for connecting said blades to the hub, and, in addition, the pendular vibration suppressor may comprise as many pendulums as the rotor has blades.

In this case, and when the rotor hub is arranged as a substantially radial plate, in an advantageously simple structure, each support has its inner radial end shaped as a clevis which straddles the outer radial edge of the substantially radial plate-like hub between the members connecting two adjacent blades to the hub, and this end is fixed to the hub by bolted connections of axis substantially parallel to the axis of the rotor, and the outer radial end of each support is also shaped as a clevis, in which is fixed a bearing block for the pivoting connection of the corresponding pendulum about the corresponding axis of pendular movement.

According to an effective and economical embodiment which is simpler to maintain and allows excellent integration into the rotor head, at least one support, but preferably each of them, is advantageously a fitting with two substantially flat and elongate mounting plates kept spaced apart substantially one above the other by the edge of the hub, the bearing block and a ball-end articulating to the support one end of a drag damper, the other end of which is articulated to one of the two connecting members between which said support is fixed to the hub.

However, whether the support is common to all the pendulums of the vibration suppressor, to just some of them, or specific to each of the pendulums, or if there is no support, the pivoting connection of at least one pendulum to the corresponding support or to the hub may advantageously be a connection with at least one rolling bearing housed in a bearing block fixed to the support or to the hub and through which there passes a pivot pin which rotates as one with each arm of said pendulum around said axis of pendular movement.

In order to allow fine adjustment of the frequency of the pendular vibration suppressor, it is furthermore advantageous that, for at least one pendulum, and preferably each of them, at least one corresponding pendular body comprises at least one part equipped with fixing and positioning means collaborating with complementary means of each corresponding pendulum arm, to allow said part of the pendular body to be fixed to said arm in an adjustable position so that the natural frequency of said pendulum can be adjusted.

To this end, in a simple and practical embodiment, the adjustable pendular body may advantageously comprise two lateral parts fixed removably by a screw to a rigid central part extended by an arm for connection to said pivoting connection on the support, each lateral part having an exterior profile that is off centered with respect to the fixing screw and having a peg projecting toward the central part and lodged in a selected one of a number of holes made in the central part facing said lateral part so that the lever arm and thus the natural frequency of the pendulum can be adjusted.

BRIEF DESCRIPTION OF THE DRAWINGS

Other advantages and features of the invention will become apparent from the description given hereinbelow, without any implied limitation, of some exemplary embodiments which are described with reference to the appended drawings, in which.

DETAILED DESCRIPTION OF THE INVENTION

Figure 1:
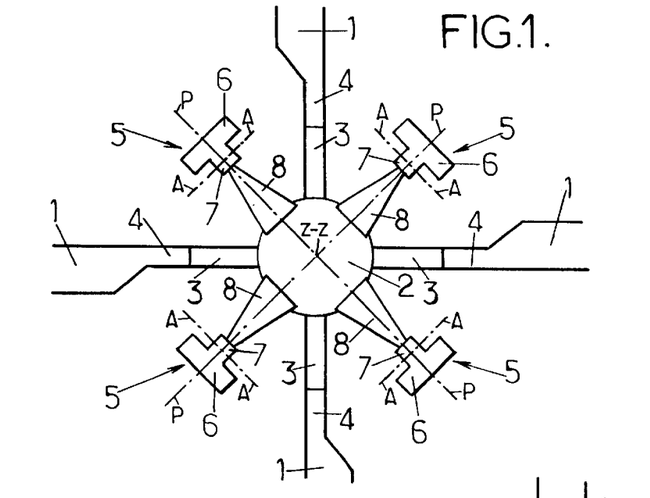
FIGS. 1 and 2 are schematic plan views of a rotor head equipped respectively with a first and with a second example of a "vertical" pendulums rotor head vibration suppressor.
Figure 2:
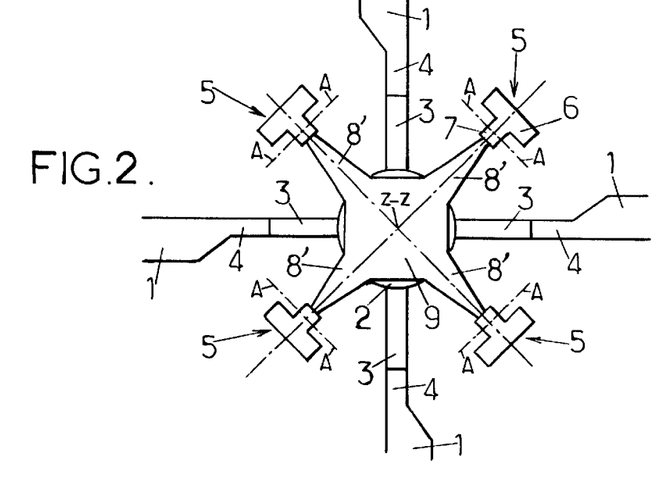

In the four-bladed rotor head of FIGS. 1 and 2, the rotor being a helicopter main rotor, each of the four blades 1 is connected to the hub 2 of the rotor, intended to be driven in rotation about its axis which is the axis Z—Z of rotation of the rotor, by a respective connecting member 3 known as a cuff in the rest of the description because its central part is tubular overall. Each cuff 3 is substantially radial with respect to the axis of the rotor Z—Z and each blade 1 is fixed by its root 4 to the outer radial end of the corresponding cuff 3, the inner radial end of which is connected to the hub 2 by retaining and articulating means (not depicted) that retain the cuff 3 and the blade 1 against the effects of centrifugal force and allow the flapping mass consisting of the cuff 3 and the corresponding blade 1 to travel in terms of pitch, drag and flapping.

The rotor head of FIG. 1 is equipped with a vibration suppressor that comprises as many "vertical" pendulums 5 as the rotor has blades 1, that is to say four pendulums 5 in this example.

As an alternative, the number of pendulums 5, at least equal to two, may differ from the number of blades 1, and be higher or lower than this number.

Each pendulum 5 comprises a pendular body 6 secured to a rigid arm 7 and connected by this arm 7 to the outer radial end of a support 8 which, in this example, is elongate, with a substantially triangular shape in plan view in FIG. 1, oriented radially with respect to the axis of the rotor Z—Z and which is always fixed rigidly to the hub 2, preferably by its inner radial end, and between the cuffs 3 of two adjacent rotor blades 1.

As an alternative, each pendulum 5 or just some of the pendulums 5 may be connected by its or their rigid arm 7 directly to the hub 2. Furthermore, all the pendulums 5 or just some of them may be connected to the hub 2 by supports which do not run between two cuffs 3 of adjacent blades 1.

The supports 8 are thus driven in rotation about the axis of the rotor Z—Z by the hub 2 to which they are fixed. Each pendulum 5 is mounted to oscillate on the corresponding support 8 via a pivoting connection about a respective axis of pendular movement A—A which is spaced away from the center of inertia of the pendulum 5 and from the axis Z—Z of the rotor, and is substantially perpendicular to a respective radial plane P passing through the axis Z—Z of the rotor and through the center of inertia of the pendulum 5, and without the possibility of the pendulum 5 oscillating or pivoting about another axis which might be parallel to the axis Z—Z of the rotor and concurrent with the axis A—A of pendular movement, at the connection between the rigid arm 7 and the support 8 (or hub 2). Each pendulum 5 therefore rotates as one with the hub 2 about the axis Z—Z of the rotor.

These radial planes P are the planes that bisect the dihedral angles formed by the radial planes passing through the longitudinal axes of blades 1 and cuffs 3 so that, in this example, each pendulum 5 oscillates about its axis of pendular movement A—A between two adjacent rotor blades 1, while at the same time being distant enough from each of these two blades 1 that it does not interfere with them in their angular travel in pitch, flapping and drag.

The exemplary vibration suppressor fitted to the rotor head in FIG. 2 differs essentially from the one described hereinabove with reference to FIG. 1 only in the structure of the support on which four pendulums 5, identical to those of FIG. 1, are mounted to oscillate.

In FIG. 2, the support 9 is a support common to all the pendulums 5 and has the form of a star-shaped plate having as many branches 8' as the rotor has blades 1 and as the vibration suppressor has pendulums 5. This star-shaped plate 9 is fixed coaxially to the hub 2 and rotates with the hub 2 about the axis Z—Z of the rotor. The relative position of the star-shaped plate 9 and of the hub 2 is such that each branch 8' of the star-shaped plate 9 extends radially toward the outside of the hub 2, with respect to the axis Z—Z of the rotor, between two adjacent cuffs 3 and the two corresponding blades 1. Each pendulum 5 is mounted to oscillate on the outer radial end of a respective one of the branches 8' of the star-shaped support 9 in the same way as each of the pendulums 5 does on the outer radial end of a support 8 of the example of FIG. 1.

Note that the embodiments in the figures do indeed allow frequency tuning even if the number of pendulums is perhaps lower than or higher than the number of blades, while remaining at least equal to two (in order to produce two forces capable of canceling the moments). A four-bladed rotor may be fitted with just three pendulums or even two pendulums. However, the imbalance that may result would then need to be compensated for using an auxiliary system, for example offset at 90° of two opposed pendulums with respect to the axis of the rotor.

In a variant, if the number of pendulums 5 is higher than the number of blades 1, the vibration suppressor may comprise several star-shaped supports such as 9, all secured to the hub 2, and for example stacked coaxially above the hub 2, and each support such as 9 may support a respective group of pendulums 5 adjusted, by adjusting their geometric and mass parameters as defined hereinafter, to be tuned to respective frequencies of (nb−1)Ω, (nb+1)Ω and nbΩ, as explained hereinafter with reference to FIG. 3.

In the two examples of FIGS. 1 and 2, the axes A—A of pendular movement are coplanar, in one and the same plane perpendicular to the axis Z—Z, but these axes of pendular movement A—A may be coplanar in several planes perpendicular to the axis Z—Z, each of these planes containing two axes of pendular movement A—A for two pendulums 5 which are diametrically opposed with respect to the axis Z—Z.

Figure 3:
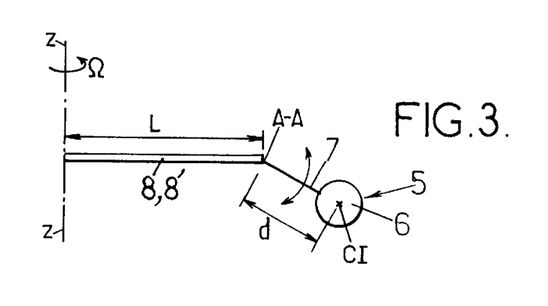
FIG. 3 is a schematic side elevation of a "vertical" pendulum oscillating on its support.

FIG. 3 illustrates the connection between a pendulum 5 and its support, which may be that of FIG. 1 or that of FIG. 2 or possibly connected directly to the outer radial edge of the hub 2. The pendulum 5, of mass m, has its pendular body 6 secured to its arm 7 and oscillating about the axis of pendular movement A—A on the outer radial end of the support 8 or 8' fixed to the rotor hub 2, and rotating therewith about the axis of rotation Z—Z at an angular speed Ω. If L denotes the linkage or attachment radius, that is to say the distance between the axes Z—Z and A—A, and if d denotes the lever arm or eccentricity of the pendulum 5, that is to say the distance between the axis A—A and the center of inertia CI of the pendulum 5, and if Io denotes the inertia of the pendulum 5 about an axis parallel to the axis of pendular movement A—A and passing through its center of inertia CI, the centrifugal force gives the pendulum 5 a natural rotational frequency ω given by formula (1) below:

$$\omega = \Omega \left( \frac{m \cdot d \cdot (L+D)}{Io + md^2} \right)^{1/2} \quad (1)$$

This formula (1) expresses the natural frequency of a "vertical" pendulum of a vibration suppressor according to the invention, assuming small angular travel.

The characteristics of mass, inertia and geometry of the pendulums 5 and of their pivoting mounting on the support 8 or 8' or on the hub 2 determine their natural frequency which is proportional to the speed of rotation of the rotor, so that choosing these mass m, inertia Io, lever arm d and attachment radius L characteristics allow their natural frequencies to be tuned to one or more harmonics of the vibrational state of the rotor so as to attenuate the vibrational excitation in this or these harmonics. In particular, the natural frequency of the pendulums 5 can be tuned to nbΩ or to (nb±1)Ω, where n is an integer at least equal to 1, and b is the number of rotor blades.

When the pendulums 5 have their natural frequency tuned to nbΩ, and in particular to bΩ and 2bΩ, the vibration suppressor has the function of opposing the forces acting on the rotor along its axis Z—Z (vertical force) and the vibration suppressor diminishes the vertical acceleration of the rotor head in bΩ or 2bΩ respectively, so that the vibrational comfort in the cabin is improved at the frequency bΩ or 2bΩ, in proportions that depend on the dynamic characteristics of the helicopter fuselage. Note that the greatest excitation corresponds to the frequency bΩ, which means that it is advantageous to tune the natural frequency of the pendulums 5 of one group of pendulums of the vibration suppressor to at least this frequency bΩ.

When the natural frequency of the pendulums 5 of the vibration suppressor is tuned to (nb±1)Ω, the vibration suppressor has the function of countering the coplanar moments acting on the rotor, which has the effect of reducing the angular acceleration of the rotor head according to the selected tuning frequency. In decreasing order of importance, the frequencies of the excitations to be attenuated are (b−1)Ω, (b+1)Ω, (2b−1)Ω and (2b+1)Ω. Thus, for a tuning frequency of (b−1)Ω or (b+1)Ω, the vibration suppressor reduces the angular acceleration of the rotor head at (b−1)Ω or (b+1)Ω, with an improvement in the vibrational comfort in the cabin at bΩ, whereas for a tuning frequency of (2b−1)Ω or (2b+1)Ω, the vibration suppressor reduces the angular acceleration of the rotor head in (2b−1)Ω or (2b+1)Ω, with an action on improving the vibrational comfort in the cabin at 2bΩ.

It is therefore advantageous for the natural frequency of the pendulums 5 of another group of pendulums 5 of the vibration suppressor to be tuned to the frequency (nb±1)Ω, and in particular (b−1)Ω and (b+1)Ω. This other group of pendulums can be subdivided into two subgroups of pendulums 5, in one of which the pendulums are tuned to (nb−1)Ω, preferably (b−1)Ω and possibly (2b−1)Ω and in the other subgroup to (nb+1)Ω, preferably (b+1)Ω and possibly (2b+1)Ω.

FIGS. 4a to 5b illustrate the principle of operation of the "vertical" pendulums vibration suppressor in the case of a vibration suppressor with four pendulums 5.

Figure 4A:
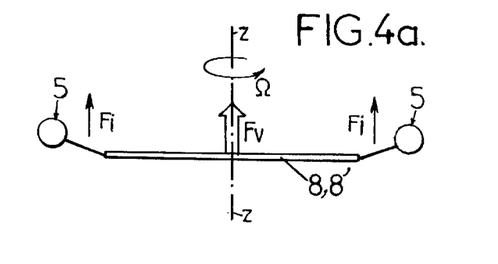
FIGS. 4a and 4b are schematic views in side elevation and in perspective, respectively, of a vibration suppressor according to the invention that opposes "vertical" forces.
Figure 4B:
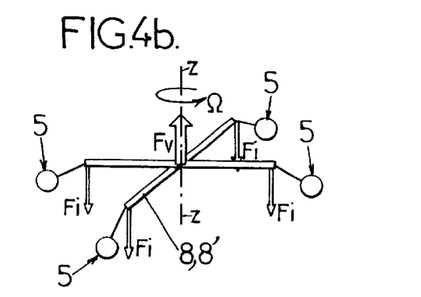

FIGS. 4a and 4b depict a configuration for reducing vertical acceleration, in which configuration the pendulums 5 oscillate simultaneously on one side or the other of the plane perpendicular to the axis Z—Z of the rotor and in which the axes of pendular movement A—A extend. In these FIGS. 4a and 4b, the dynamic "vertical" force acting on the rotor is indicated by the arrow Fv, while the pendular inertial forces introduced by the pendulums 5 are indicated by the arrows Fi.

Figure 5A:
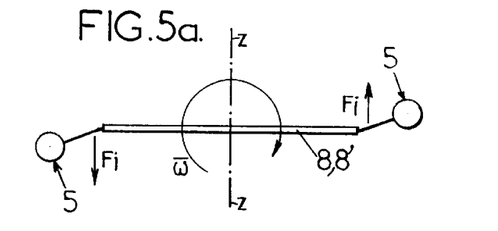
FIGS. 5a and 5b are views similar to FIGS. 4a and 4b of a vibration suppressor according to the invention opposing a coplanar moment.
Figure 5B:
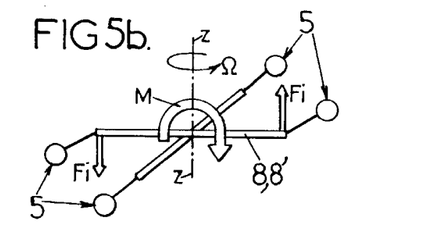

FIGS. 5a and 5b depict the configuration in which the "vertical" pendulum rotor head vibration suppressor opposes the coplanar moment, two pendulums 5 oscillating in opposition one above and the other below the plane perpendicular to the rotor axis Z—Z containing the axes of pendular movement A—A. The inertial pendular forces are indicated by the arrows Fi and the coplanar dynamic moment is indicated as M in FIG. 5b. This results in a reduction in the angular acceleration indicated by the arrow ω in FIG. 5a.

The vibration suppressor of the invention may make it possible to attenuate two rotor harmonics, in a rotating frame of reference, which may prove penalizing to the level of vibration in the cabin, particularly the harmonics bΩ and (b−1)Ω, which correspond to the greatest excitations of, respectively, forces along the rotor axis and the coplanar moment. To this end, a certain number (at least two) of the pendulums 5, uniformly distributed about the axis Z—Z of the rotor, have their natural frequency tuned to nbΩ, and more particularly to bΩ, while the other pendulums 5 (at least two), also uniformly distributed about the axis Z—Z, have their natural frequency tuned to (nb−1)Ω, and more particularly to (b−1)Ω so as to carry out filtering at two distinct rotor harmonics. In this case, the pendulums 5 of the two groups may be fixed, as described with reference to FIGS. 1 and 2, in one and the same plane perpendicular to the axis Z—Z or in planes which are mutually parallel and are perpendicular to the axis Z—Z, depending on whether use is being made of one or two star-shaped supports such as 9 in FIG. 2 superposed one on the other and both fixed to the hub 2, or of supports such as 8 in FIG. 1, fixed to the hub 2 at various levels along the axis Z—Z.

Figure 6:
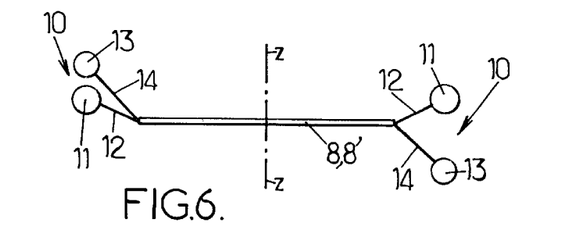
FIG. 6 is a schematic side elevation of a "vertical" double pendulums vibration suppressor, in one behavioral mode.

As a variant, and to the same end, each of the simple pendulums 5 in the preceding examples may be replaced by a double pendulum 10, as depicted diagrammatically in FIG. 6. Each double pendulum 10 then comprises a first pendular body 11 secured to a first arm 12 by which the pendular body 11 is mounted to oscillate about an axis of pendular movement A—A on the outer radial end of a support or support branch such as 8 or 8' in FIGS. 1 and 2, the double pendulum 10 also comprising a second pendular body 13 secured to a second arm 14 by which it is mounted to pivot about the same axis of pendular movement A—A on the same outer radial end of the same support 8 or 8'. The masses of the pendular bodies 11 and 13 and/or the lengths of the arms 12 and 14 differ from one another so that the lever arms differ although the radius of attachment is common, and the natural frequencies of the two pendulums 11–12 and 13–14 of each double pendulum 10 are thus tuned, for example, so that one of the pendulums 11–12 tuned to nbΩ filters the vertical acceleration while the other pendulum 13–14, tuned to (nb−1)Ω or to (nb+1)Ω to attenuate the coplanar moments, filters the angular acceleration acting on the hub to which the support or supports 8 or 8' is or are secured.

Thus, the pendulums 13–14 of all the double pendulums 10 may constitute a first group of pendulums tuned to (nb−1)Ω or (nb+1)Ω, and in particular to (b−1)Ω or (b+1)Ω, to attenuate the coplanar moments, whereas the other pendulums 11–12 of all the pendulums 10 may constitute a second group of pendulums tuned to nbΩ, and in particular to bΩ, to filter the "vertical" (along the axis Z—Z) forces.

Figure 7:
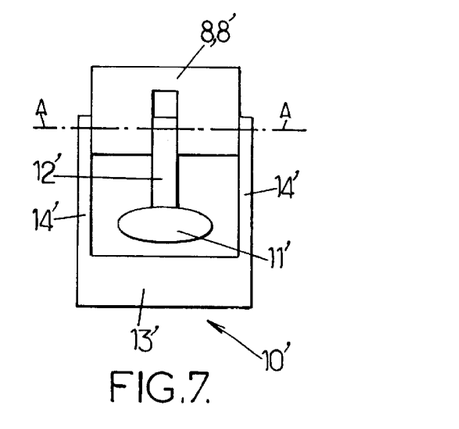
FIGS. 7 and 8 are schematic end-on views of first and second double-pendulums embodiments, respectively.
Figure 8:
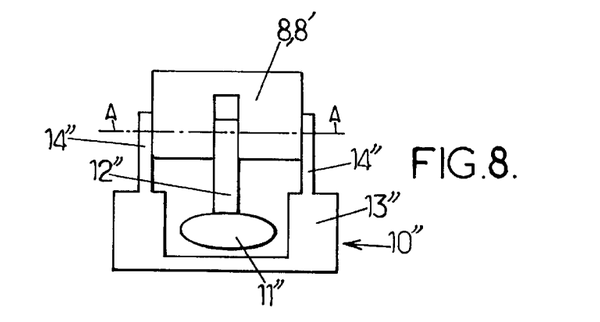

FIGS. 7 and 8 schematically depict two exemplary embodiments of such double pendulums.

The one in FIG. 7 can be applied to the filtering of two distinct harmonics of the rotor. This double pendulum 10' comprises a first pendular body 11' of ovoid shape secured to one end of a first arm 12' connected to the common support 8 or 8' by a connection articulated about the axis A—A of pendular movement, and the double pendulum 10' also comprises a second pendular body 13', on the outside of the first 11' with respect to the axis A—A and connected by a pivoting connection about the same axis of pendular movement A—A to the support 8 or 8' by two second arms 14' laterally on each side of the first arm 12' and of the first pendular body 11'. Thus, the first pendulum 11'–12' is imbricated inside the second pendulum 13'–14', the same attachment support 8 or 8' being used for these two pendulums.

The double pendulum 10" in FIG. 8 can be applied to optimizing the filtering, according to the speed of travel of the helicopter, of a single harmonic of the rotor vibrational state, for example (b−1)Ω. Specifically, to filter a given rotor harmonic, experience has shown that the optimum adjustment of a pendulum varies with the speed of travel of the helicopter, or more generally of the rotorcraft. This phenomenon, which is due to non-linear relationships between, for example, the dynamics of the rotorcraft structure and the intensity of the rotor excitation, generally leads to a compromise being made between the effectiveness of a single pendulum at low and high rotorcraft speeds of travel. A double pendulum, like the one 10" in FIG. 8, made up of two pendulums tuned to slightly different natural frequencies, allows a first simple pendulum such as 11"–12" of the double pendulum 10" to be made to work at low speeds and the second simple pendulum such as 13"–14" to be made to work at higher speeds of travel of the rotorcraft. In this example also, the two simple pendulums of the double pendulum 10" are imbricated one inside the other, and oscillate about one and the same axis of pendular movement A—A on one and the same support 8 or 8'. The first simple pendulum or inner pendulum, consisting of the pendular body 11" and of the central arm 12" is of a structure entirely analogous to that of the pendulum 11'–12' of the double pendulum 10' of FIG. 7, and the second simple pendulum consists of a second pendular body 13" with mass distributed essentially laterally on the sides of the first pendular body 11", and connected to the support 8 or 8' by two lateral arms 14", so as to give the second pendulum 13"–14" a lever arm that differs very little from that of the first pendulum 11"–12". The latter, which is the lighter pendulum, is tuned to the low speeds for the harmonic chosen, because the excitation to be filtered is then lower. The second pendulum 13"–14", which is the heavier one, is tuned to the high speeds for this same harmonic. As an option, the lighter pendulum could be tuned to the high speed domain.

As an alternative, the vibration suppressor may comprise two groups of double pendulums which are different, one group having its first and second pendulums tuned respectively to the low and high speeds for one harmonic (nb−1)Ω or (nb+1)Ω, in particular (b−1)Ω or (b+1)Ω, and the other group having its first and second pendulums tuned respectively to the low and high speeds for a harmonic nbΩ and particularly bΩ.

Figure 9:
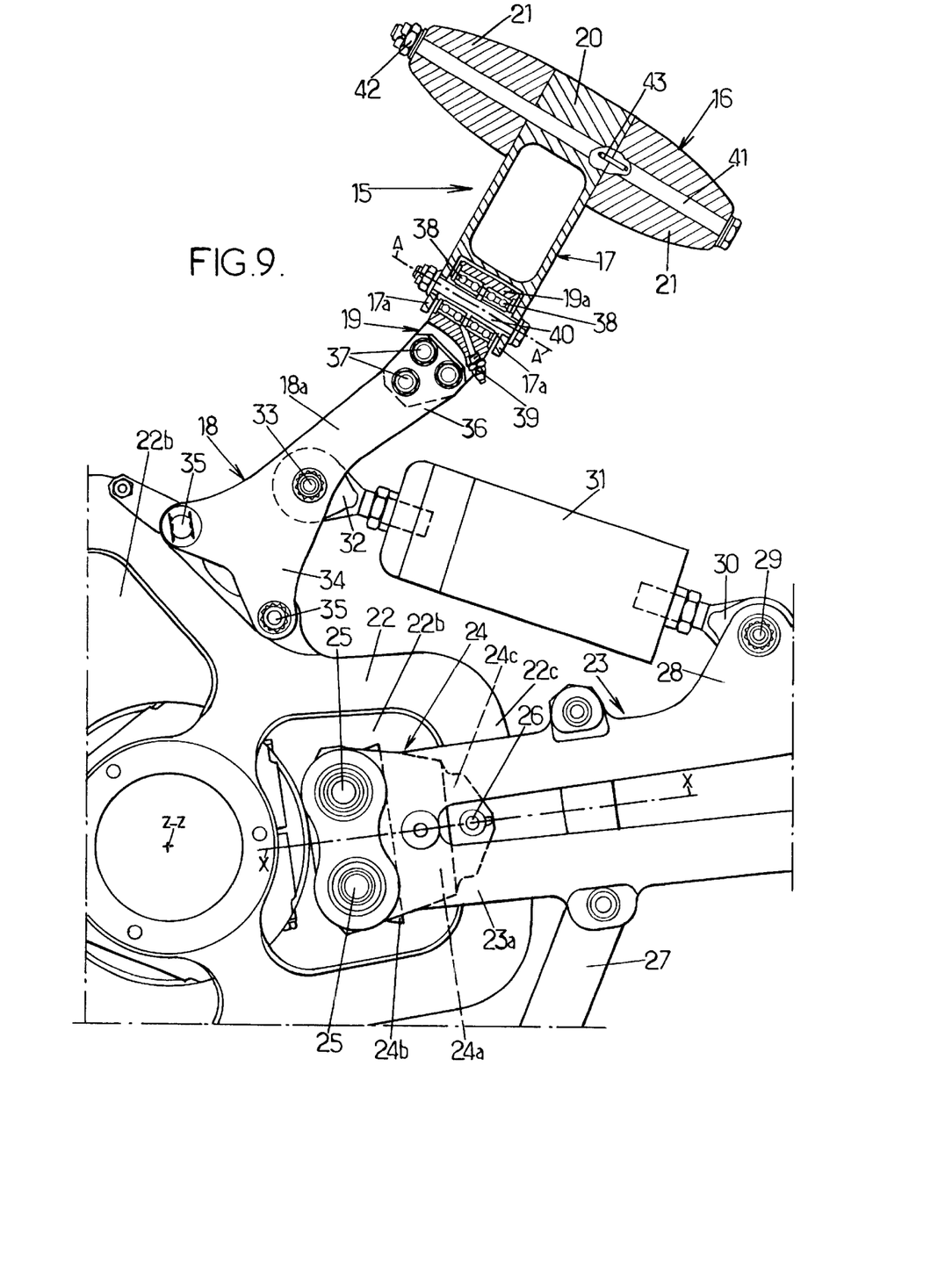
FIG. 9 is a partial and schematic plan view, partly in cross section, of a three-bladed rotor head and of its "vertical" pendulums vibration suppressor.
Figure 10:
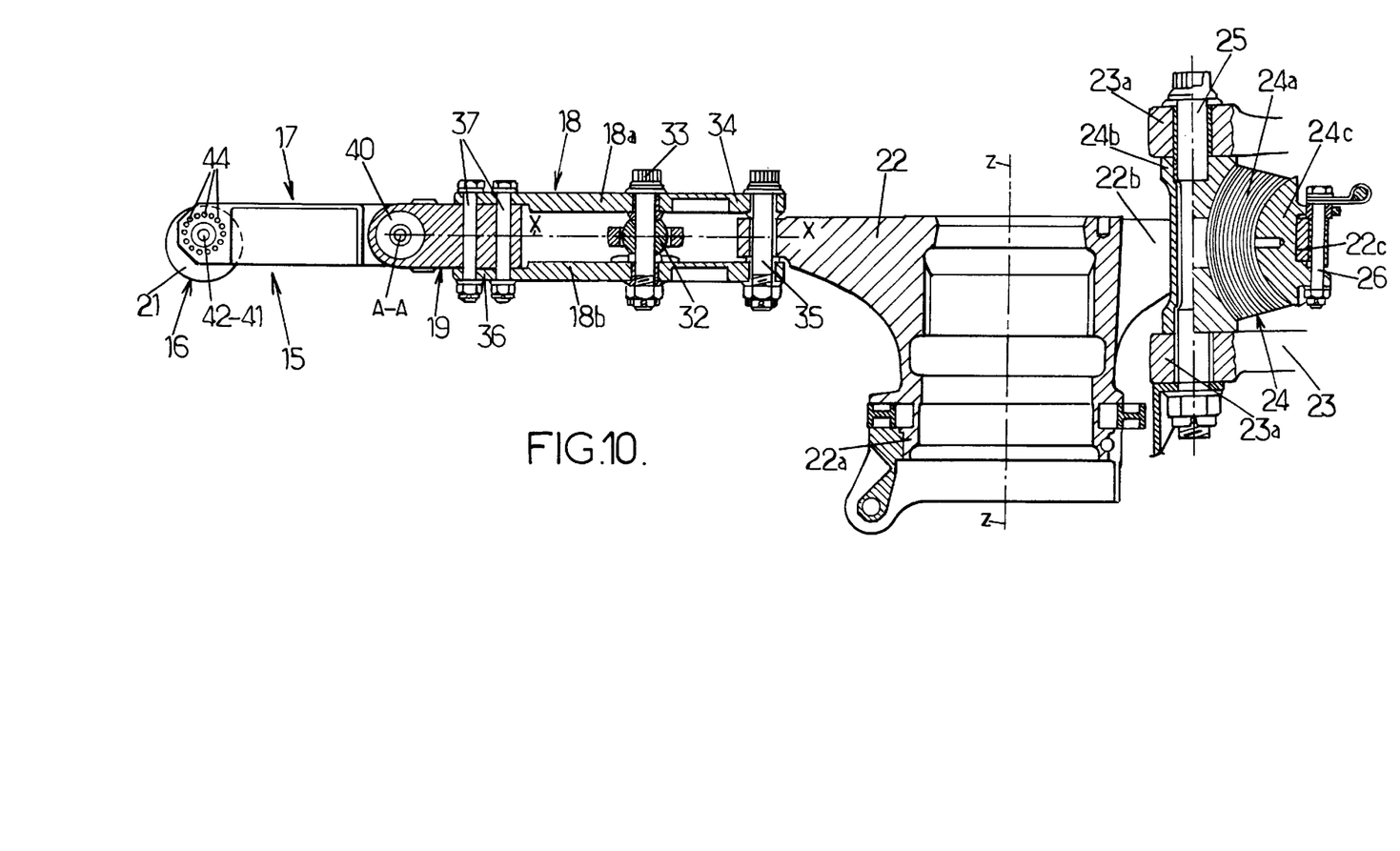
FIG. 10 is a schematic view in broken axial section of the rotor head and of the vibration suppressor of FIG. 9.

FIGS. 9 and 10 schematically depict a three-bladed rotor head equipped with a vibration suppressor with three "vertical" pendulums, just one of which has been depicted in FIGS. 9 and 10 and which has been tested in flight tuned to bΩ, on the one hand, and (b−1)Ω on the other. As regards the tuning to bΩ, the flight tests were performed with fixings to the hub such as those depicted in FIGS. 9 and 10, and corresponding to the architecture of FIG. 1, that is to say with a support specific to each pendulum and fixed to the edge of the hub, and with fixing by means of a single star-shaped support fixed to the hub as depicted schematically in FIG. 2.

In all instances it was possible to observe correct vibration suppression operation, provided the tuning frequency was finely adjusted, which adjustment was obtained by altering the length of the lever arm of the pendulums. A substantial reduction in the vertical acceleration in bΩ of the rotor head was obtained with a vibration suppressor tuned to bΩ. Likewise, substantial reductions in the tangential acceleration for (b−1)Ω and in the coplanar moment of the rotor head for (b−1)Ω were obtained with the vibration suppressor tuned to $(b-1)\Omega$, these reductions being associated with the reduction in the angular acceleration of the rotor head for this harmonic.

At the same time, no significant increase in the stresses in the blades was observed, either in drag or in flapping, and regardless of the frequency considered.

The three-bladed rotor with a vibration suppressor with three "vertical" pendulums with which such results were obtained in flight is described more specifically hereinbelow.

FIGS. 9 and 10 depict a three-bladed rotor, the general structure of which is well known, and which comprises a hub 22 driven by its tubular base 22a in rotation about its axis which is the axis Z—Z of rotation of the rotor, the hub 22 being connected to each of the three rotor blades by a substantially radial respective connecting cuff 23, just one of which is partially depicted for reasons of simplicity.

In this example the hub 22 is of the radial plate type having, for each of the three blades, an axial cavity 22b bounded by an outer radial edge 22c of the hub 22. Each cuff 23 connecting a blade to the hub 22 is itself connected to the hub 22 by retaining and articulating means 24. Each cuff 23 is arranged, at its outer radial end (not depicted in FIGS. 9 and 10) as an outer radial clevis, between the two branches of which the root of the corresponding blade is retained by two mutually parallel pins which are substantially parallel to the axis of the rotor, in a way which is well known. The inner radial end of each cuff 23 is also arranged as an inner radial clevis 23a, between the two branches of which an inner radial armature 24b of the retaining and articulating means 24 is fixed as a spacing piece by two threaded studs 25. In this example, these means 24 are produced in the known form of a spherical laminated stop, the central part 24a of which is an alternating stack of rigid cups and of layers of elastomer in the form of spherical caps with the concave side facing toward the outer edge 22c of the hub 22, this laminated central part 24a being bonded between the inner radial armature 24b and an outer radial armature 24c fixed to the outer edge 22c of the corresponding cavity 22b of the hub 22 by a screw-nut system schematically depicted as 26. Thus, the spherical laminated stop 24 connecting a cuff 23 secured to a blade to the hub 22 is essentially housed in the corresponding cavity 22b of the hub 22.

Laterally on one side of its longitudinal axis X—X, each cuff 23 supports a pitch lever 27, depicted partially in FIG. 9, while laterally on the other side of its longitudinal axis X—X, this cuff 23 has a clevis 28 projecting laterally, in which the ball of a ball end 30 at one axial end of a drag damper 31 is retained by a bolt 29, the other axial end of which drag damper is also a ball end 32, the ball of which is retained by a screw-nut system 33 between the central parts of the two plates 18a and 18b of a support fitting 18 of one of the three "vertical" pendulums 15 of the pendular vibration suppressor with which the rotor head just described is equipped.

The mounting plates 18a and 18b of the support fitting 18 are rigid, elongate, substantially flat and have the same shape in plan view, with a substantially trapezoidal end part 34 via which the upper mounting plate 18a and the lower mounting plate 18b are fixed, by two bolts 35 with axes parallel to the axis Z—Z, against the respective upper and lower faces of the outer radial edge of the hub plate 22, in a part which is concave radially outward that the hub plate 22 has substantially between two adjacent cavities 22b. The fitting 18 is thus arranged, at its inner radial end, as a clevis consisting of the trapezoidal parts 34 of the mounting plates 18a and 18b, and straddling the outer radial edge of the hub plate 22 between two adjacent cuffs 23 and the two corresponding blades. The fitting 18 thus extends laterally toward the outside of the hub 22, perpendicularly to the axis Z—Z, while at the same time being slightly inclined with respect to the radial direction so as to leave enough space for the drag damper 31 to be fitted between the fitting 18 and the cuff 23, and the fitting 18 is secured to the hub 22 in coaxial rotation about the axis of the rotor Z—Z.

The opposite end of the mounting plates 18a and 18b to their trapezoidal end 34 is a substantially rectangular part 36 which is slightly bent toward the radial direction, so that the outer radial end of the fitting 18 is also arranged as a clevis consisting of the parts 36, between which a bearing block 19 is fixed by three screw-nut systems 37 with axes parallel to those of the screw-nut system 33 and of the bolts 35. The plates 18a and 18b are thus kept spaced apart one above the other by the edge of the hub plate 22, the bearing block 19 and the ball end 32.

Projecting radially toward the outside of the fitting 18, the bearing block 19 has a semicylindrical end 19a pierced transversely with a bore which houses, side by side, two ball bearings 38 of the pivoting connection of the corresponding pendulum 15 to the bearing block 19 and to the fitting 18. The two rolling bearings 38 are coaxial about the axis of pendular movement A—A of the pendulum 15 and may be greased by a greasing nipple 39 fitted laterally on the bearing block 19 in a passage that opens into the bore of the rolling bearing 38.

The pendulum 15 comprises a pendular body 16 secured to one end of a rigid arm 17, the other end of which is arranged as a clevis 17a straddling the two lateral faces of the semicylindrical end 19a of the bearing block 19 and mounted to pivot about the geometric axis of pendular movement A—A defined by the two rolling bearings 38, by an axis consisting of the screw of a screw-nut system 40, this screw passing through the rolling bearings 38 and the two branches of the clevis 17a with which the screw is connected in terms of rotation.

The pendular body 16, of substantially ovoid profiled shape, consists of a massive central part 20, of one piece with the arm 17, and of two lateral parts or masses 21, which can be fixed removably to the central part 20 using a screw 41 passing through aligned central bores in the three parts 20 and 21, and on the threaded end of which a nut 42 is tightened and retained.

The outer lateral surface or exterior profile of the lateral parts 21 does not exhibit symmetry of revolution about the longitudinal axis of the screw 41 but on the other hand is slightly off centered with respect to the axis of this screw 41. Furthermore, each lateral part 21 has a peg 43 (just one of which is depicted in FIG. 9) projecting, parallel to the screw 41, from its plane face of contact with the plane lateral face opposite it belonging to the central part 20, and this peg 43 can be inserted, when the lateral parts 21 are being mounted on the central part 20, selectively in any one of the holes 44 (see FIG. 10) pierced in a ring around the passage bore for the screw 41 and parallel to its axis in this plane lateral face of the central part 20.

The position of the center of inertia of the pendular body 16 and therefore of the pendulum 15 can thus be modified, and in this way the lever arm of the pendulum 15 and thus its natural frequency can be adjusted.

If each hole 44 corresponds to a given tuned frequency, it is thus possible, by selecting which hole 44 will accommodate the peg 43 of each of the lateral parts 21, to set the frequency of the vibration suppressor.

Of course, in place of the setting system using a peg which is accommodated in one of a number of holes, use could be made of other known mechanisms that allow a lateral part 21 to be fixed on the central part 20 with a greater or lesser degree of eccentricity with respect to the screw 41.

In general, the pendular body 16 of a pendulum 15 comprises at least one part which is equipped with removable fixing and positioning means collaborating with complementary means on the arm 17 of this pendulum 15 so as to allow this part of the pendular body 16 to be fixed in an adjustable position on the arm 17 so that the position of the center of inertia of the pendulum 15 can be modified and the natural frequency of this pendulum thus adjusted.

It will be understood that this yields a pendular vibration suppressor which is compact, entirely mechanical and therefore passive, self-adjusting because associated with the variations in rotor speed, and particularly well suited to helicopter main rotors comprising from three to five blades. In effect, the vibration suppressor is installed on the hub, rather than on the blades, and the volumes swept by the oscillating pendular bodies do not interfere with the volumes swept by the blades and cuffs for connection to the hub, or by the members associated with the latter items, such as the pitch control levers, the anti-cone stops and drag stops and drag dampers during the movements of the blades in terms of pitch, flapping and drag, particularly because the pendulums are supported, by their respective support, radially on the outside of these members. As the pendulums are not supported by the blades, the dynamic response of the blades and the stresses in the blades are unaffected. Furthermore, the "vertical" pendulums of the vibration suppressor are of a simple structure and readily accessible on the rotor head, and are therefore easier to maintain.

What is claimed is:

1. A rotorcraft rotor comprising a rotor head at which a hub intended to be driven in rotation about an axis of the rotor is connected to at least two rotor blades, the rotor also comprising a pendular vibration suppressor comprising at least two pendulums, each of which comprises at least one pendular body connected by at least one rigid arm to said hub so that each pendulum is driven by said hub in rotation about the rotor axis, and mounted so as to oscillate with respect to said hub via a pivoting connection about an axis of pendular movement which is spaced away from the center of inertia of the pendulum and from the axis of the rotor and is at a fixed distance from the rotor axis and is substantially perpendicular to a radial plane passing through the axis of the rotor and through the center of inertia of the corresponding pendulum without the possibility of the pendulum oscillating about an axis parallel to the axis of the rotor and concurrent with the axis of pendular movement so as to attenuate vibration generated by the movement of the rotor, wherein the mass and the inertia of each pendulum of a first group of at least two pendulums, and a lever arm between the center of inertia and the axis of pendular movement of said pendulum, and a radius of attachment between the axis of the pendular movement and the axis of the rotor, are chosen so that the natural frequency of the pendulum is tuned to attenuate coplanar moments, to $(nb+1)\Omega$ or $(nb-1)\Omega$ where n is an integer at least equal to 1, b is the number of rotor blades and $\Omega$ is the rotational speed of the rotor.

2. The rotor as claimed in claim 1, wherein the mass and the inertia of each pendulum of a second group of at least two pendulums, and a lever arm between the center of inertia and the axis of pendular movement of said pendulum, and the radius of attachment between the axis of the pendular movement and the axis of the rotor, are chosen so that the natural frequency of the pendulum is tuned to filter forces along the axis of the rotor, to $nb\Omega$, where n is an integer at least equal to 1, b is the number of rotor blades and $\Omega$ is the rotational speed of the rotor.

3. The rotor as claimed in claim 1, wherein the pendular vibration suppressor comprises at least one double pendulum comprising two pendular bodies oscillating about one and the same axis of pendular movement and each connected to said hub by at least one respective arm, the two pendular bodies and their respective arms having two different natural frequencies.

4. The rotor as claimed in claim 3, wherein, on at least one double pendulum of the pendular vibration suppressor, a first pendular body is connected to the hub by a first arm mounted to oscillate between two second arms connecting a second pendular body to the hub so that the first pendular body and the first arm are imbricated between the two second arms and the second pendular body.

5. The rotor as claimed in claim 1, wherein the pendular vibration suppressor comprises at least one support driven in rotation by said hub about the axis of the rotor and on which the pendulums are mounted to oscillate by corresponding pivoting connections, said support being substantially star-shaped, having branches supporting pendulums and being fixed coaxially to the hub so that each branch of the star-shaped support extends substantially radially outward with respect to the axis of the rotor and supports an oscillating pendulum at its outer radial end.

6. The rotor as claimed in claim 1, wherein the pendular vibration suppressor comprises supports which rotate as one with the hub about the axis of the rotor, each support being substantially elongate and oriented substantially radially with respect to the axis of the rotor, each support supporting at least one oscillating pendulum at its outer radial end and being fixed by its inner radial end directly to the hub.

7. The rotor as claimed in claim 1, wherein each pendulum is mounted to oscillate substantially between two adjacent blades of the rotor.

8. The rotor as claimed in claim 1, wherein the pendular vibration suppressor comprises as many pendulums as the rotor has blades.

9. The rotor as claimed in claim 6, wherein each support has an inner radial end shaped as a clevis which straddles an outer radial edge of the substantially radial plate-like hub between the members connecting two adjacent blades to the hub, and said end is fixed to the hub by bolted connections of axis substantially parallel to the axis of the rotor, and an outer radial end of each support is also shaped as a clevis, in which is fixed a bearing block for the pivoting connection of the corresponding pendulum about the corresponding axis of pendular movement.

10. The rotor as claimed in claim 9, wherein at least one support is a fitting with two substantially flat and elongate mounting plates kept spaced apart substantially one above the other by the edge of the hub, the bearing block and a ball-end articulating to the support one end of a drag damper, an other end of which is articulated to one of the two connecting members between which said support is fixed to the hub.

11. The rotor as claimed in claim 1, wherein said pivoting connection of at least one pendulum to the corresponding support is a connection with at least one rolling bearing housed in a bearing block fixed to the support and through which there passes a pivot pin which rotates as one with each arm of said pendulum around said axis of pendular movement.

12. The rotor as claimed in claim 1, wherein, for at least one pendulum, at least one corresponding pendular body comprises at least one part equipped with fixing and positioning means collaborating with complementary means of each corresponding pendulum arm, to allow said part of the pendular body to be fixed to said arm in an adjustable position so that the natural frequency of said pendulum can be adjusted.

13. The rotor as claimed in claim 12, wherein said pendular body comprises two lateral parts fixed removably by a screw to a rigid central part extended by an arm for connection to said pivoting connection on the support, each lateral part having an exterior profile that is off centered with respect to the fixing screw and having a peg projecting toward the central part and lodged in a selected one of a number of holes made in the central part facing said lateral part so that the lever arm and thus the natural frequency of the pendulum can be adjusted.

\* \* \* \* \*